US011511945B1

(12) United States Patent
Thomas et al.

(10) Patent No.: US 11,511,945 B1
(45) Date of Patent: Nov. 29, 2022

(54) SYSTEMS AND METHODS TO SECURE ROLLABLE CARTS TO SORTATION SYSTEMS

(71) Applicant: Amazon Technologies, Inc., Seattle, WA (US)

(72) Inventors: Jason Dwayne Thomas, Bowling Green, KY (US); Sean Murphy, Hendersonville, TN (US); Trudy Parnell, Goodlettsville, TN (US); Robert Theodore Cassidy, Cincinnati, OH (US); Sian Leng Lee Chew, Brentwood, TN (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/215,391

(22) Filed: Mar. 29, 2021

(51) Int. Cl.
*B65G 47/44* (2006.01)
*B65G 11/20* (2006.01)

(52) U.S. Cl.
CPC ............ *B65G 47/44* (2013.01); *B65G 11/203* (2013.01)

(58) Field of Classification Search
CPC .............................. B65G 47/44; B65G 11/203
USPC ........ 198/617, 528, 563, 370.04; 410/66, 80
See application file for complete search history.

(56) References Cited

U.S. PATENT DOCUMENTS

| | | | | |
|---|---|---|---|---|
| 2,950,126 A * | 8/1960 | Armentrout | ............. | B62B 5/00 410/66 |
| 3,894,625 A * | 7/1975 | Boyle | .................. | B65G 47/44 198/395 |
| 3,984,117 A * | 10/1976 | Bates | ........................ | B60P 7/08 410/77 |
| 4,020,959 A * | 5/1977 | Livesay | ............. | B60B 33/0089 414/508 |
| 5,429,286 A * | 7/1995 | Foust | ........................ | B60P 7/08 224/570 |
| 6,095,314 A * | 8/2000 | Fortenbery | .......... | B65G 47/766 198/360 |
| 6,099,220 A * | 8/2000 | Poth | ........................ | B62B 5/049 410/121 |
| 6,564,927 B2 * | 5/2003 | Meyer | .................... | B65B 57/20 193/46 |
| 7,025,548 B2 * | 4/2006 | Krawczyk | ................ | B62B 3/16 410/66 |

(Continued)

OTHER PUBLICATIONS

U.S. 2021/0047133 A1, Hoag et al., Feb. 18 (Year: 2021).*

*Primary Examiner* — Douglas A Hess
(74) *Attorney, Agent, or Firm* — Eversheds Sutherland (US) LLP

(57) ABSTRACT

Systems and methods are disclosed to secure rollable carts to sortation systems. In one embodiment, an example system may include a first chute configured to guide packages to a first moveable cart that is disposed at a first end of the first chute, and a first anti-tip mechanism configured to prevent tipping of the first moveable cart. The first anti-tip mechanism may include a frame, a first C-shaped component coupled to the frame, and a second C-shaped component coupled to the frame. The first C-shaped component may be configured to engage a first portion of the first moveable cart, and the second C-shaped component may be configured to engage a second portion of the first moveable cart, such that the first moveable cart is prevented from vertical movement.

19 Claims, 13 Drawing Sheets

(56) References Cited

U.S. PATENT DOCUMENTS

| | | | | |
|---|---|---|---|---|
| 7,404,479 B1 * | 7/2008 | Shoemaker | ............. | B61B 10/04 |
| | | | | 198/465.1 |
| 7,798,502 B2 * | 9/2010 | Sukey | ........................ | B62B 3/10 |
| | | | | 108/50.01 |
| 8,556,084 B1 * | 10/2013 | Snook | .................. | B65G 11/063 |
| | | | | 209/583 |
| 10,065,807 B1 * | 9/2018 | Garrett | ....................... | B07C 5/36 |
| 10,092,098 B2 * | 10/2018 | Jackson | ................. | F16M 13/02 |
| 10,577,193 B1 * | 3/2020 | Erceg | ..................... | B65G 43/08 |

* cited by examiner

US 11,511,945 B1

SYSTEMS AND METHODS TO SECURE ROLLABLE CARTS TO SORTATION SYSTEMS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
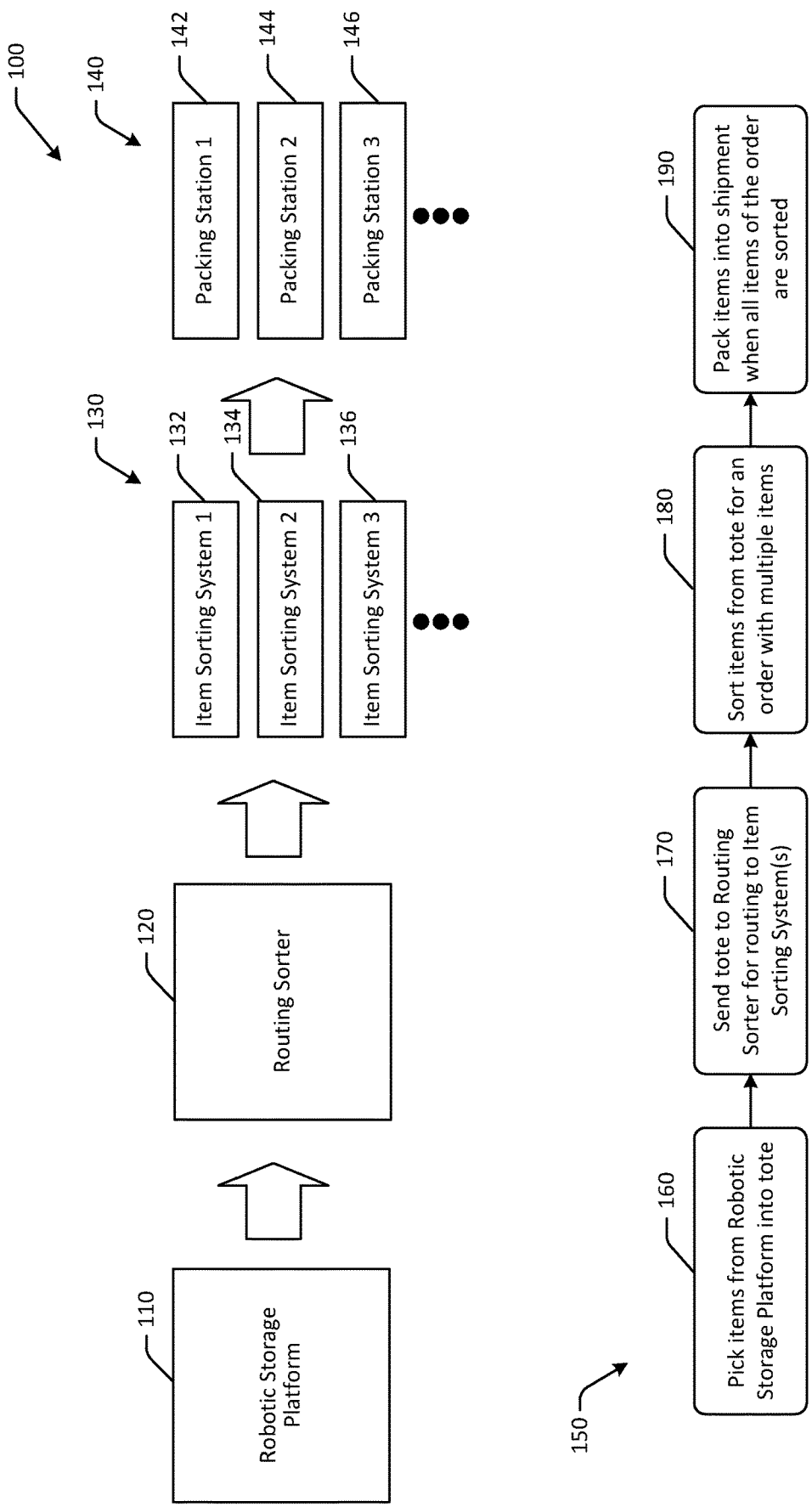
FIG. 1 is a hybrid schematic illustration of an example use case for systems and methods to secure rollable carts to sortation systems and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted.

In addition, once items are packed into packages for shipping, such packages may be processed for delivery to a user, where such processes may include sortation of labeled packages, and so forth. Depending on the type of item and/or the number of items inside a package, packages may have different sizes and weights. As such packages are sorted or otherwise moved throughout facilities, the packages may be handled by robots or machines in some instances, such as conveyors, diverters, and so forth. At times, packages may be directed down chutes or ramps into containers for aggregation. For example, packages destined for a similar destination may be aggregated into a container for shipment.

Some systems may use moveable carts as containers to receive packages that are deposited down a ramp or chute. Such moveable carts may be configured to roll (e.g., an operator may manually push or pull the moveable cart, etc.) and/or be lifted from a bottom surface or otherwise transported by a robot. However, depending on the angle of the ramp or chute down which a package is directed, along with dimensions, geometry, and/or weight of a package, orientation of the movable cart, and/or a point of impact between the package and the moveable cart, packages may cause the moveable carts to tip over. For example, if a moveable cart has a rectangular geometry and is oriented lengthwise (e.g., with its long axis aligned with the ramp or chute, etc.), the moveable cart may be more susceptible to tipping over than if aligned widthwise. Similarly, depending on the contents of the moveable cart, or an amount of capacity the moveable cart that has been filled, a likelihood that the moveable cart will tip over may change. For example, if a moveable cart is empty and a heavy package impacts the moveable cart near a top end along a sidewall, the likelihood that the moveable cart tips over may be greater than if the moveable cart was full of packages. In instances where a moveable cart tips over, a safety hazard may be created and packages may be lost. Moreover, if a package does not cause the moveable cart to tip over, the package may still cause the moveable cart to roll away from its position at the end of a chute.

Embodiments of the disclosure include systems and methods to prevent tipping of movable carts and unintended rolling of moveable carts, regardless of the orientation of the movable cart, the weight, dimensions, or geometry of packages, or the amount of capacity filled in the moveable cart. Some embodiments include anti-tip mechanisms that passively prevent tipping of a moveable cart by preventing vertical movement of a bottom or lower platform of the moveable cart. Such embodiments may be passive in that an operator or robot may not have to take any additional action to secure the cart to the anti-tip mechanism. Some embodiments may further include one or more sensors that may be coupled to, or may be integrated with, the anti-tip mechanism that indicate the presence of a moveable cart, thereby automatically triggering delivery of packages to the secured moveable cart, such as from a conveyor. Some embodiments may further include one or more latches that can be used to secure the moveable cart from rolling away from the chute or ramp, without the need for a foot brake or other additional hardware on the moveable cart. For example, some embodiments may include one or more latches coupled to guide rails that prevent movement of the moveable cart out of a slot in which the moveable cart is positioned. Embodiments may therefore prevent tipping and/or unintended movement of moveable carts when receiving packages or other items from angled chutes or ramps. As a result, throughput of fulfillment centers may be improved, and/or logistics of fulfillment center operations may be less complicated.

Referring to FIG. 1, an example use case 100 for systems and methods to secure rollable carts to sortation systems and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine. For example, a certain tote may be associated with a certain item sorting system, such that products that are designated to be picked and placed in the tote are for orders that are to be consolidated at that particular item sorting system. The association between the tote and the item sorting system may optionally be static.

At the routing sorter 120, totes including products that have been picked may be routed to the appropriate or designated item sorting system. For example, the routing sorter 120 may determine an identifier associated with the tote, and may determine one or more item sorting systems to which the tote is to be routed using the identifier. The routing sorter 120 may route or direct the tote to the appropriate item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for multi-item orders. For example, a first tote may include a first item of a multi-item order, and a second tote may include a second item of the multi-item order. The item sorting system may therefore identify the orders associated with the respective products in a tote, and may transport the products to a container, such as a flexible container, associated with the order. When the order is complete with all of the products in the associated flexible container, the order may be packed. Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate flexible containers for the orders for which the products were picked.

After a multi-item order is complete (e.g., the item sorting system has delivered all of the products in the order to the appropriate flexible container, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. Packages may be aggregated into moveable carts and/or may otherwise be transported using moveable carts as described herein. In some embodiments, moveable carts may be used to transport items in addition to, or instead of, packages.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
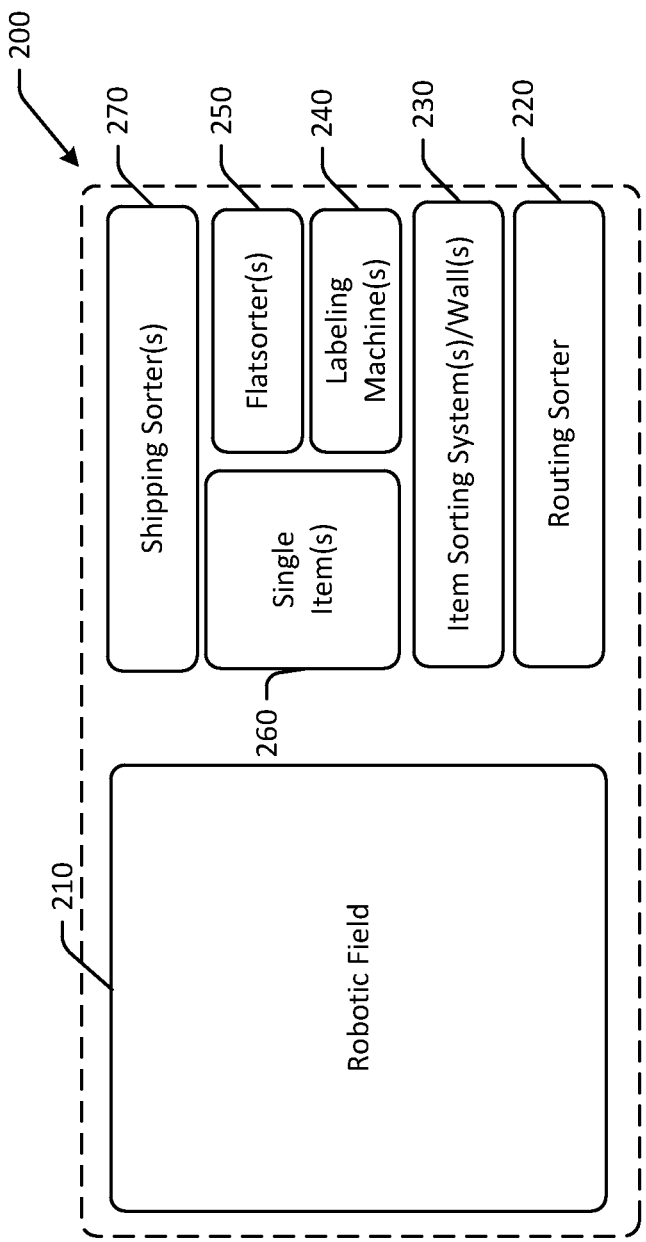
FIG. 2 is a hybrid schematic illustration of an example use case for systems and methods to secure rollable carts to sortation systems in accordance with one or more embodiments of the disclosure.

FIG. 2 is a hybrid schematic illustration of an example use case for systems and methods to secure rollable carts to sortation systems in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 (e.g., package sortation system, etc.) to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into moveable carts using chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of flexible containers (e.g. induct individual items from a container that has multiple items, and place the inducted items into the appropriate flexible container, where flexible containers are associated with multi-item orders. The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include systems and methods to secure rollable carts to sortation systems. The rollable carts or moveable carts may be used to aggregate packages (e.g., in conjunction with a shipping sorter 270, etc.) and/or to aggregate items (e.g., in conjunction with an item sorting system 230, etc.). Embodiments may remove potential safety hazards by preventing tipping or rolling of the moveable carts. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 3:
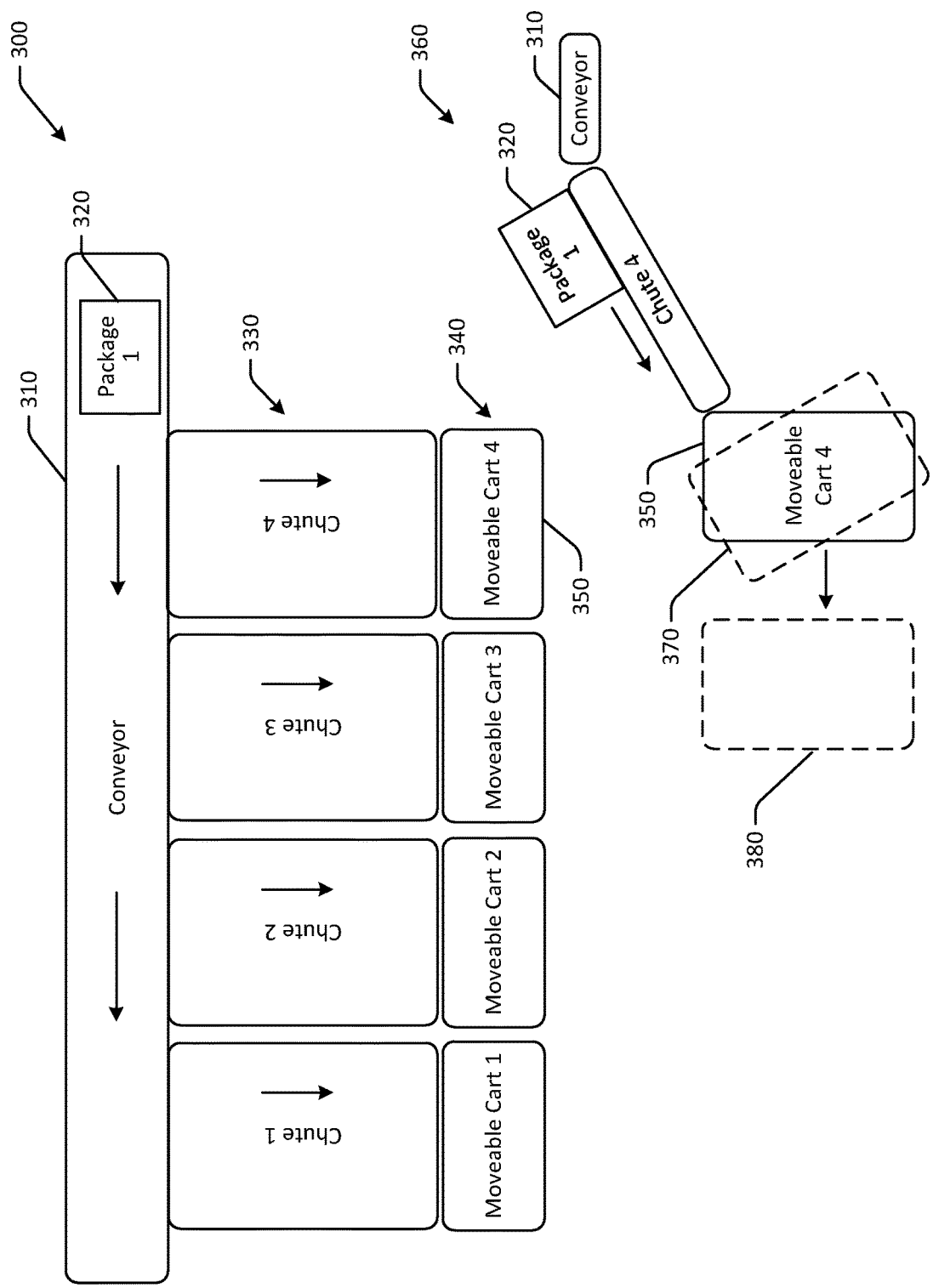
FIG. 3 is a schematic illustration of a sortation system and additional components in accordance with one or more embodiments of the disclosure.

FIG. 3 is a schematic illustration of a sortation system 300 and additional components in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the item sorting system or the package sortation system discussed with respect to FIGS. 1-2.

In FIG. 3, a conveyor 310 may be used to transport packages 320. The packages 320 may be diverted down one or more chutes 330 to different corresponding moveable carts 340. For example, the conveyor 310 may be elevated with respect to the moveable carts 340. Each of the moveable carts 340 may be disposed at an end, such as a lower end, of a corresponding chute 330. The chutes 330 may therefore be angled, such as at an angle of 25 degrees or 35 degrees, or another angle, with respect to horizontal. The chutes 330 may be associated with different destinations, and the packages intended for the respective destinations may be diverted down the corresponding chutes 330. Although depicted as having chutes 330 on one side of the conveyor 310, other embodiments may include chutes 330 and moveable carts 340 on both sides of the conveyor 310. The packages 320 may be diverted manually or using arms or bars that are automatically controlled.

As depicted in a side schematic view 360, in some instances, packages may cause a moveable cart to tip and/or roll away from the chutes 330. For example, as the package 320 is diverted from the conveyor 310 down chute 4 of the chutes 330 to a moveable cart 350 of the carts 340, the package 320 may impact the moveable cart 350 at a top end and cause the moveable cart 350 to tip 370. If the impact is great enough, the moveable cart 350 may tip over and fall to the floor. In some instances, the package 320 may not cause the moveable cart 350 to fully tip over, but to roll 380 away from the chute 330. Both tipping of the moveable cart 350 and rolling of the moveable cart 350 are undesirable.

Figure 5:
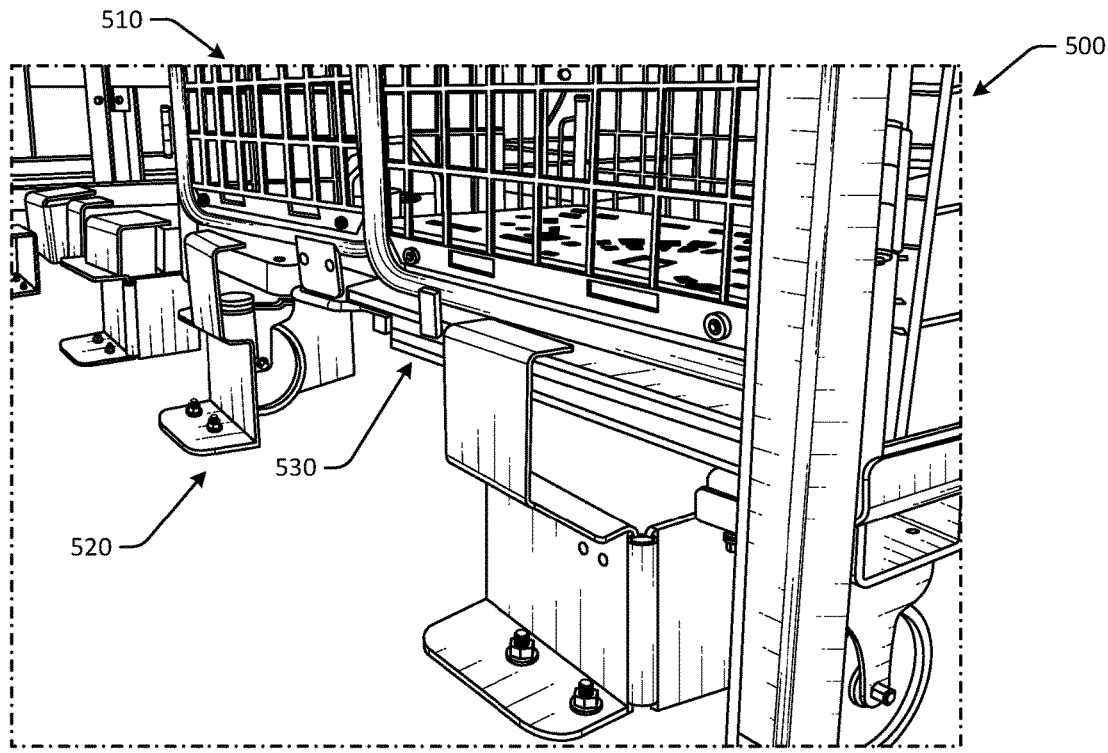
FIG. 5 is a schematic illustration of a moveable cart engaged with an anti-tip mechanism in accordance with one or more embodiments of the disclosure.
Figure 5:
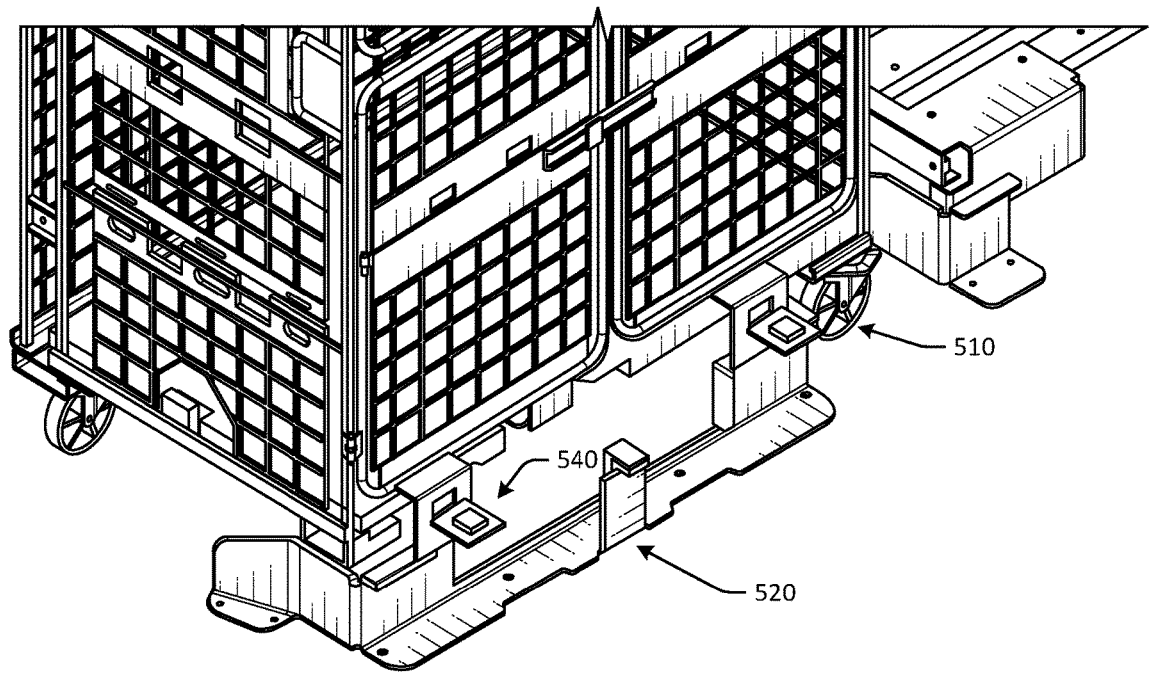
Figure 6A:
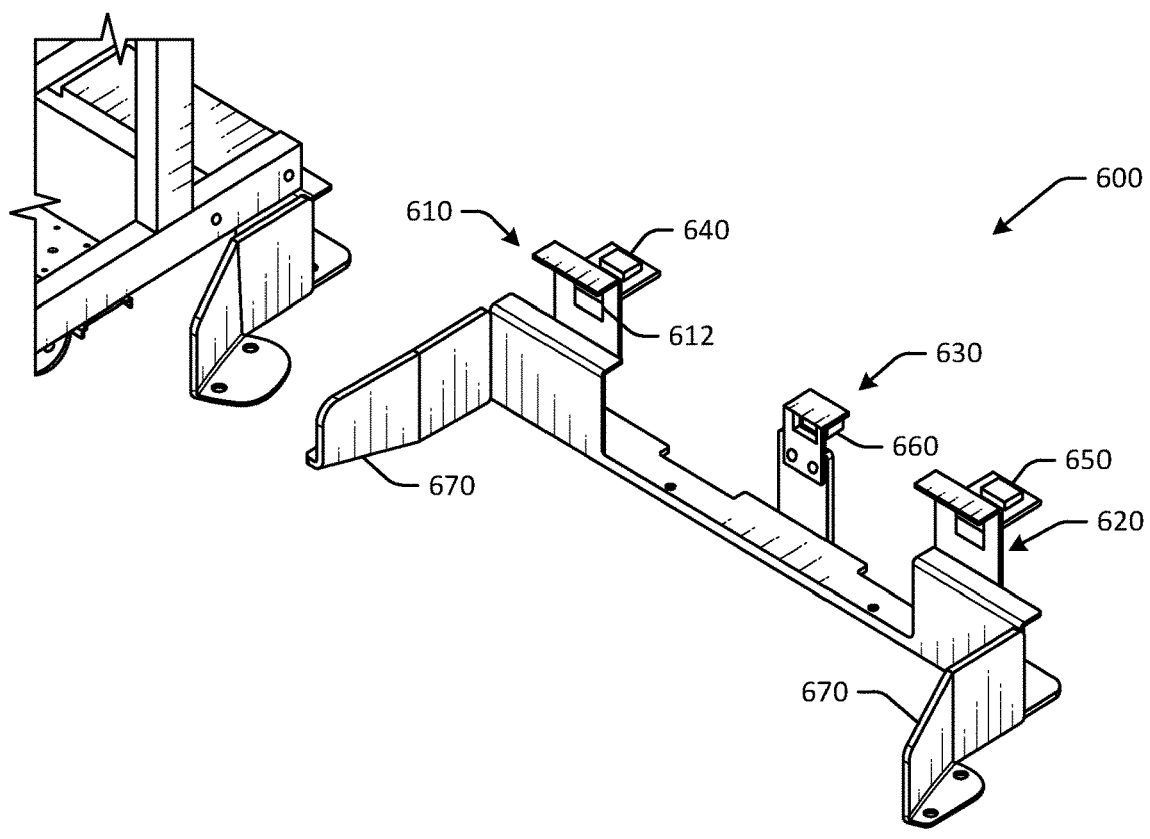
FIGS. 6A-6C are schematic illustrations of an anti-tip mechanism in accordance with one or more embodiments of the disclosure.
Figure 6A:
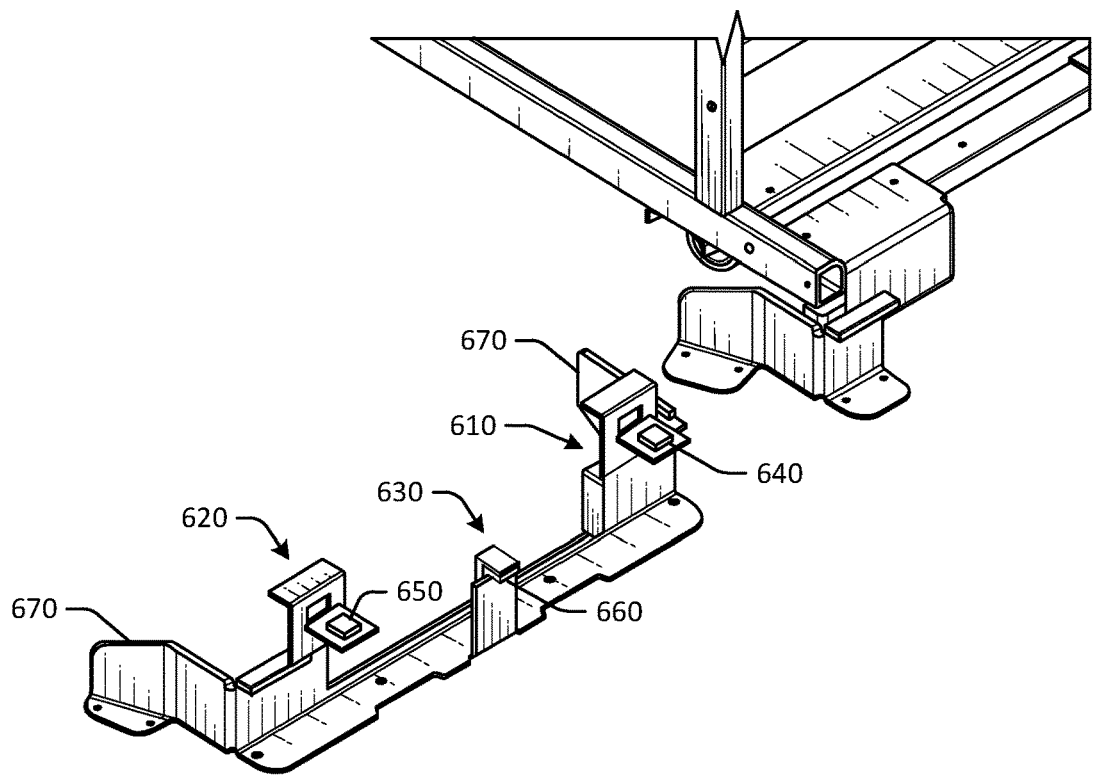
Figure 6B:
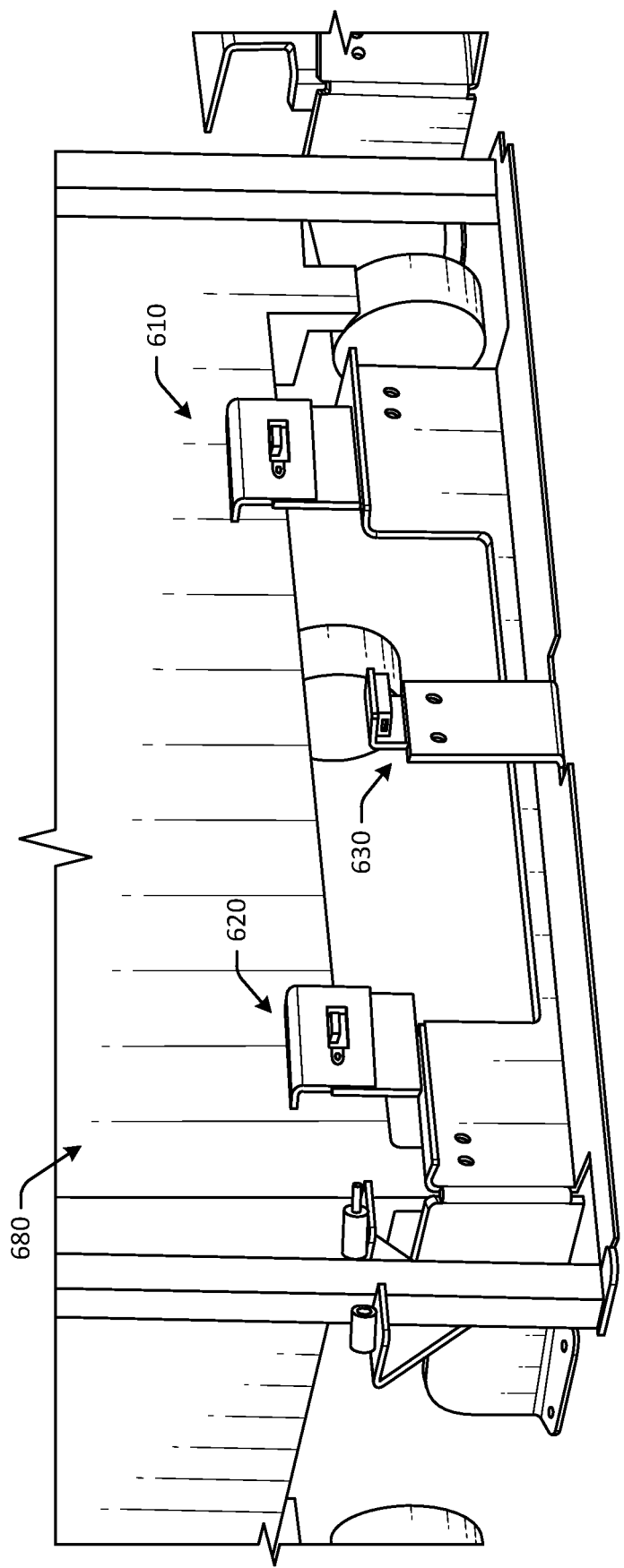
Figure 6C:
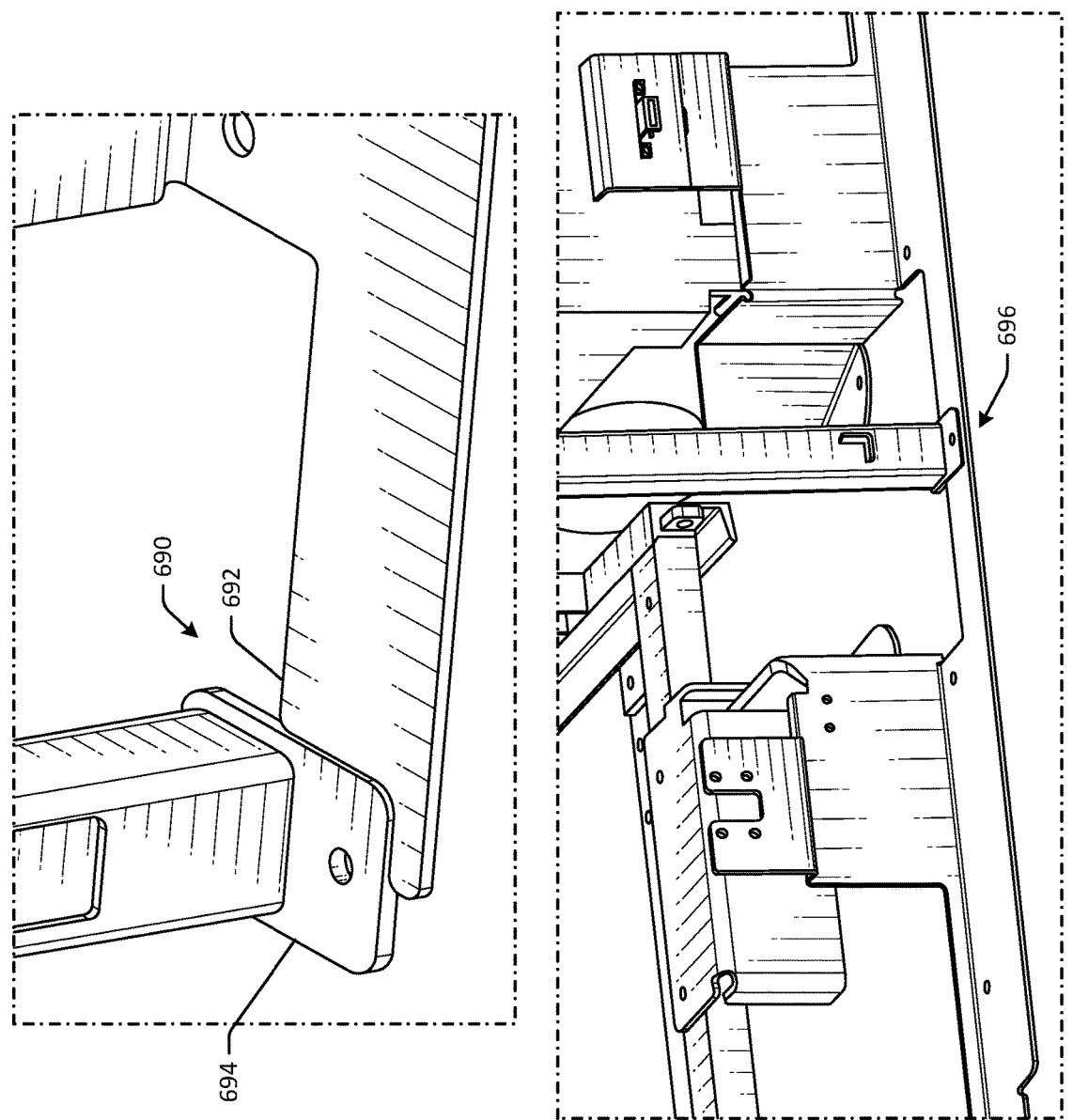

Embodiments of the disclosure prevent tipping and rolling of the moveable cart 350 via an anti-tipping mechanism, as discussed with respect to FIGS. 5-6C, and an anti-rolling mechanism, as discussed with respect to FIGS. 7A-7D. Embodiments may include the conveyor 310 that may be disposed adjacent to a second end or an upper end of a first chute, where the packages 320 move along the conveyor 310. Any number of chutes and moveable carts may be included. For example, embodiments may include a first chute configured to guide packages to a first moveable cart that is disposed at a first end, or lower end, of the first chute, a second chute configured to guide packages to a second moveable cart that is disposed at a first end of the second chute, and so forth. Embodiments may include a first anti-tip mechanism configured to prevent tipping of the first moveable cart, a second anti-tip mechanism configured to prevent tipping of the second moveable cart, and so forth.

Figure 4:
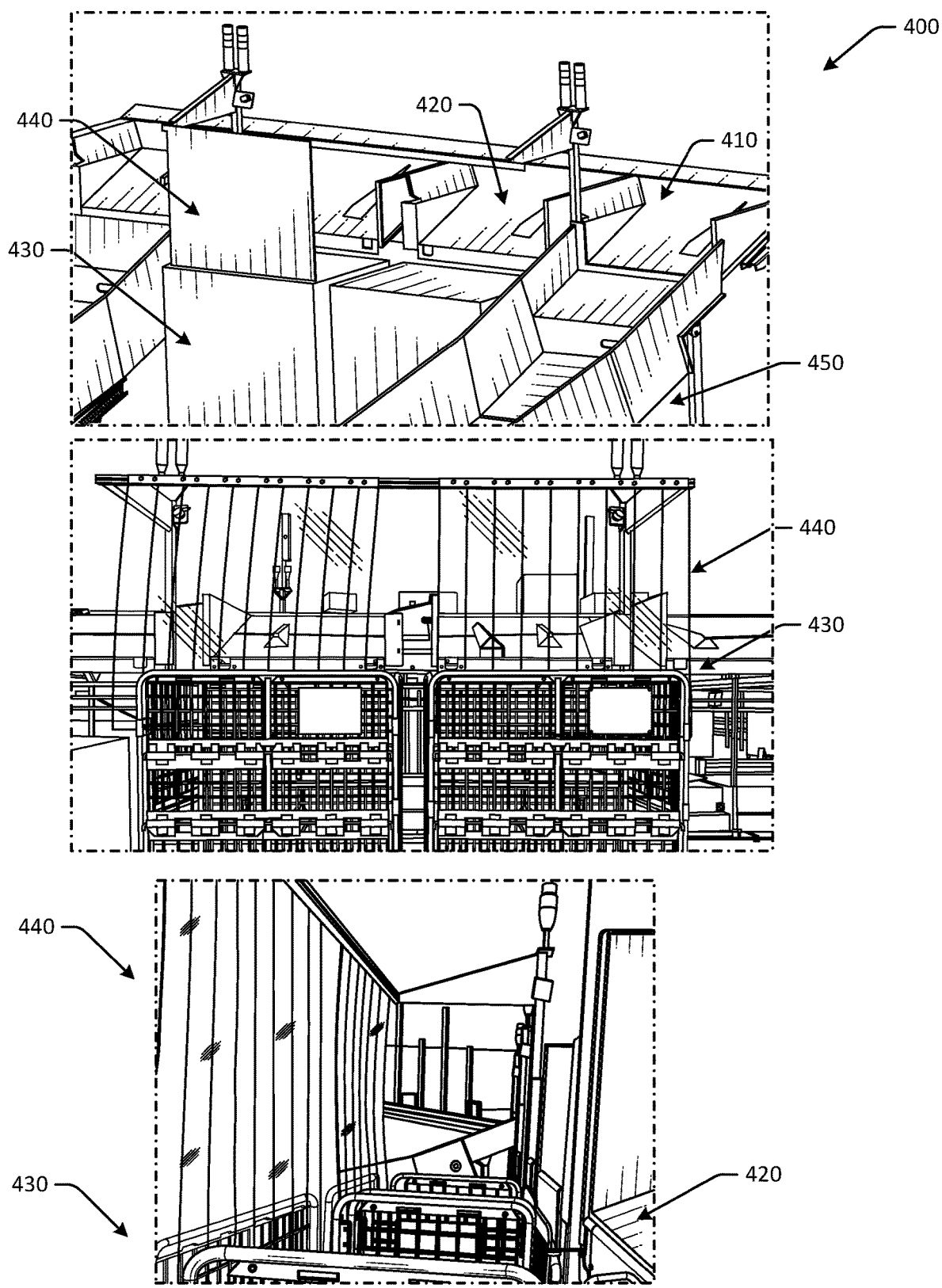
FIG. 4 is a schematic illustration of a sortation system with a number of moveable carts in accordance with one or more embodiments of the disclosure.

FIG. 4 is a schematic illustration of a sortation system 400 with a number of moveable carts in accordance with one or more embodiments of the disclosure. Other embodiments may include additional or fewer components. The illustration of FIG. 4 may not be to scale, and may not be illustrated to scale with respect to other figures. The sortation system illustrated in FIG. 4 may be the same sortation system discussed with respect to FIGS. 1-3.

In FIG. 4, the sortation system 400 may be configured to direct packages to one or more moveable carts, as well as to one or more other downstream destinations. For example, the sortation system 400 may include a conveyor 410, and one or more ramps 420 that lead to moveable carts 430. Some embodiments may include barriers 440, such as sheets of vinyl or other materials that form a curtain around at least a portion of a moveable cart, so as to prevent packages from flying off of a ramp 420 and out of the moveable cart. The sortation system 400 may include one or more additional ramps 450 that lead to different containers or different downstream processes instead of moveable carts.

As packages are diverted down the ramps 420, the packages may be aggregated into moveable carts 430. Each of the moveable carts 430 may be coupled to an anti-tip mechanism that prevents the moveable cart from tipping away from the chute and/or conveyor 410, as well as an anti-roll mechanism that prevents the moveable cart from rolling away from the chute and/or conveyor 410. In one embodiment, the sortation system 400 may include a first chute configured to guide packages to a first moveable cart that is disposed at a first end of the first chute, a first moveable cart having a bottom platform, where the first moveable cart is configured to be both manually rolled and lifted by a robotic vehicle via the bottom platform, and a first anti-tip mechanism configured to prevent tipping of the first moveable cart. As discussed with respect to FIGS. 5-6C, the first anti-tip mechanism may include a frame, a first C-shaped component coupled to the frame, and a second C-shaped component coupled to the frame. The first C-shaped component may be configured to engage a first portion of the first moveable cart, such as a first portion of the bottom platform of the moveable cart, and the second C-shaped component is configured to engage a second portion of the first moveable cart, such as a first portion of the bottom platform of the moveable cart. As a result, the first moveable cart is prevented from vertical movement and/or tipping.

FIG. 5 is a schematic illustration of a use case 500 with a moveable cart 510 engaged with an anti-tip mechanism 520 in accordance with one or more embodiments of the disclosure. Other embodiments may include additional or fewer components. The illustration of FIG. 5 may not be to scale, and may not be illustrated to scale with respect to other figures. The moveable cart 510 and anti-tip mechanism 520 illustrated in FIG. 5 may be the same moveable cart and anti-tip mechanism discussed with respect to FIGS. 1-4.

As depicted in FIG. 5, the moveable cart 510 may include a bottom deck or platform 530 that forms a bottom or lower surface of the moveable cart 510. The anti-tip mechanism 520 may be configured to passively engage the platform 530 of the moveable cart 510, so as to prevent the platform 530 from vertical movement, or lifting off a floor or ground surface. The anti-tip mechanism 520 may be disposed adjacent to the chute and/or sortation system, such that the moveable cart 510 is pushed into contact with the anti-tip mechanism 520 as the moveable cart 510 is positioned adjacent to a chute to receive packages.

In some embodiments, such as that illustrated in FIG. 5, the anti-tip mechanism may be coupled to a floor or a ground surface, and not coupled to the sortation system. The anti-tip mechanism 520 may therefore be retrofitted to existing facilities. In other embodiments, the anti-tip mechanism 520 may be coupled to a sortation system frame or other related component. The anti-tip mechanism 520 may be passive in that an operator handling the moveable cart 510 may not have to take any action other than moving the moveable cart 510 into its correct location in order to secure the moveable cart 510 to the anti-tip mechanism 520, and/or to remove the moveable cart 510 from the anti-tip mechanism 520.

As discussed in detail with respect to FIGS. 6A-6C, the anti-tip mechanism 520 may include one or more sensors 540. In some embodiments, the sortation system may include the one or more sensors 540, and the anti-tip mechanism 520 may be coupled to the one or more sensors 540. The sensors 540 may be used to detect or otherwise determine the presence of the moveable cart 510, indicating that the moveable cart 510 is engaged with the anti-tip mechanism 520. The sensors 540 may therefore be proximity sensors in one embodiment. Based on the determination that the moveable cart 510 is in the correct position, direction of packages down a chute corresponding to the location of the moveable cart 510 may be triggered automatically. For example, a controller may determine that the moveable cart 510 is in a secured position based on feedback from the sensors 540, and may therefore cause packages to be diverted down the chute corresponding to the location of the moveable cart 510.

FIGS. 6A-6C are schematic illustrations of an anti-tip mechanism 600 in accordance with one or more embodiments of the disclosure. Other embodiments may include additional or fewer components. The illustration of FIGS. 6A-6C may not be to scale, and may not be illustrated to scale with respect to other figures. The anti-tip mechanism 600 illustrated in FIGS. 6A-6C may be used with any of the systems discussed with respect to FIGS. 1-5.

In FIG. 6A, the anti-tip mechanism 600 is depicted in front and rear perspective views. The anti-tip mechanism 600 may be configured to passively secure a moveable cart by preventing tipping of the moveable cart, regardless of impact by packages or other items. A moveable cart may be removably coupled to the anti-tip mechanism 600 by pushing of the moveable cart into or adjacent to the anti-tip mechanism 600.

The anti-tip mechanism 600 may be used with a sortation system in one embodiment. The sortation system may include a first chute configured to guide packages to a first moveable cart that is disposed at a first end of the first chute. The first moveable cart may include a bottom platform, and may be configured to be manually rolled and/or lifted by a robotic vehicle via the bottom platform. In some embodiments, the anti-tip mechanism 600 may be coupled to a floor of a facility, and is not directly coupled to the sortation system. In such embodiments, the anti-tip mechanism 600 may be retrofitted to existing facilities. In other embodiments, the anti-tip mechanism 600 may be coupled to a sortation system.

The anti-tip mechanism 600 maybe configured to prevent tipping of moveable carts engaged with the anti-tip mechanism 600. The anti-tip mechanism 600 may include a frame, and a first C-shaped component 610 coupled to the frame or integrated with the frame. For example, the first C-shaped component 610 may be a separable component or may be formed by the frame as a one-piece assembly. The anti-tip mechanism 600 may include a second C-shaped component 620 that is coupled to the frame or integrated with the frame. The first C-shaped component 610 may be configured to engage a first portion of a moveable cart, and the second C-shaped component 620 may be configured to engage a second portion of the moveable cart, such that the moveable cart is prevented from vertical movement. For example, the first C-shaped component 610 and the second C-shaped component 620 may be configured to engage portions of a bottom platform of a moveable cart. Other embodiments may be configured to engage different portions of the moveable cart, such as mesh sidewalls. For example, the first C-shaped component 610 and the second C-shaped component 620 may have adjustable vertical positions or heights, and may be reconfigurable to move from a first vertical position to a second vertical position, so as to accommodate different types and sizes of carts or other containers. In some embodiments, the first C-shaped component 610 and the second C-shaped component 620 may be manually moved between vertical positions, while in other embodiments, the first C-shaped component 610 and the second C-shaped component 620 may be automatically actuated from the first vertical position or vertical height to a different vertical position or vertical height. In some embodiments, the moveable cart may have a deck or platform that engages the first C-shaped component 610 and the second C-shaped component 620 when the moveable cart is positioned adjacent to the first end of the first chute, or is otherwise engaged with the anti-tip mechanism 600.

The anti-tip mechanism 600 may include one or more flared guides 670, such as a set of flared guides, to facilitate positioning of moveable carts adjacent to the anti-tip mechanism 600. The set of flared guides 670 may assist with positioning of moveable carts so as to engage the first C-shaped component 610 and the second C-shaped component 620.

The anti-tip mechanism 600 may include one or more sensors used to detect positioning and/or presence of a moveable cart. For example, the anti-tip mechanism 600 may include a first sensor 640 coupled to the first C-shaped component 610, and a second sensor 650 coupled to the second C-shaped component 620. In some embodiments, the first sensor 640 and/or the second sensor 650 may be proximity sensors, and may be configured to detect presence of a cart that is engaged with the anti-tip mechanism 600. For example, the first sensor 640 may be configured to detect presence of a first side of the cart, and the second sensor 650 may be configured to detect presence of a second side of the cart. If feedback from both sensors is positive, such feedback may indicate that a cart is fully engaged with the anti-tip mechanism 600 (e.g., the cart is not tilted or otherwise misaligned, etc.). The C-shaped components may include cutouts 612 to provide visibility for the sensors to function. The first sensor 640 and the second sensor 650 may be configured to detect presence of a moveable cart within a predetermined distance of the respective first sensor 640 and the second sensor 650, and may be positioned accordingly. Some embodiments may include one of the first sensor 640 or the second sensor 650, and not both the first sensor 640 and the second sensor 650, so as to reduce system complexity.

In some embodiments, the anti-tip mechanism 600 may include a third sensor 660 coupled to the frame or a bracket 630 of the anti-tip mechanism 600. The third sensor 660 may be disposed between the first sensor 640 and the second sensor 650. However, the third sensor 660 may be disposed at a different vertical position than the first sensor 640 and the second sensor 650. For example, as depicted in FIG. 6B, the first sensor 640 and the second sensor 650 may be at the same vertical height, and the third sensor 660 may be at a different vertical height relative to a ground surface. The lower positioning of the third sensor 660 may be used to provide visibility to the third sensor 660 under a moveable cart 680. For example, the third sensor 660 may be configured to detect or identify a robot positioned under the moveable cart 680 (e.g., a robot that is configured to move the moveable cart 680 to another location, etc.). In some embodiments, the third sensor 660 may be used to detect the presence of other types of containers, such as gaylords, bins, totes, or different types of containers.

Based on feedback from the first sensor 640, second sensor 650, and/or third sensor 660, the sortation system may include a controller configured to perform automated functionality. For example, the controller may be configured to determine, based at least in part on feedback from the first sensor 640, the second sensor 650, and/or the third sensor 660 that the moveable cart 680 is positioned adjacent to the anti-tip mechanism 600 and/or at the end of a chute, and to automatically cause packages to be diverted down the chute. As a result, an operator may not have to manually control delivery of packages to a cart. Instead, once the cart is properly positioned, delivery of packages may automatically begin.

FIG. 6C depicts cutouts 690 that can be made in the frame of the anti-tip mechanism 600 for retrofitting purposes and/or integration with existing structural components for sortation systems. For example, the anti-tip mechanism 600 may include a base plate 692 with the cutout 690 that allows for placement of the anti-tip mechanism 600 adjacent to a pillar base 694 of the sortation system. Multiple anti-tip mechanisms may be positioned adjacent to each other via mirrored cutouts 696.

FIGS. 7A-7D are schematic illustrations of an anti-roll mechanism 700 in accordance with one or more embodiments of the disclosure. Other embodiments may include additional or fewer components. The illustration of FIGS. 7A-7D may not be to scale, and may not be illustrated to scale with respect to other figures. The system illustrated in FIGS. 7A-7D may be the same system discussed with respect to FIGS. 1-6C.

A sortation system may include a conveyor along which a first package and a second package move. As depicted in FIG. 7C, the sortation system may include one or more chutes, such as a plurality of chutes 780, disposed adjacent to the conveyor. The plurality of chutes 780 may include a first chute and a second chute, where packages can be diverted from the conveyor to a chute of the plurality of chutes 780. As depicted in FIG. 7D, a first rollable cart 792 may be disposed at an end of the first chute, where the first rollable cart 792 is engaged with an anti-tip mechanism, and where packages sliding down the first chute and land in the first rollable cart 792. A second rollable cart disposed at an end of the second chute, and so forth. Any number of carts and/or chutes may be included. Some embodiments may include extended ramps 790 instead of carts, as depicted in FIG. 7D.

Figure 7A:
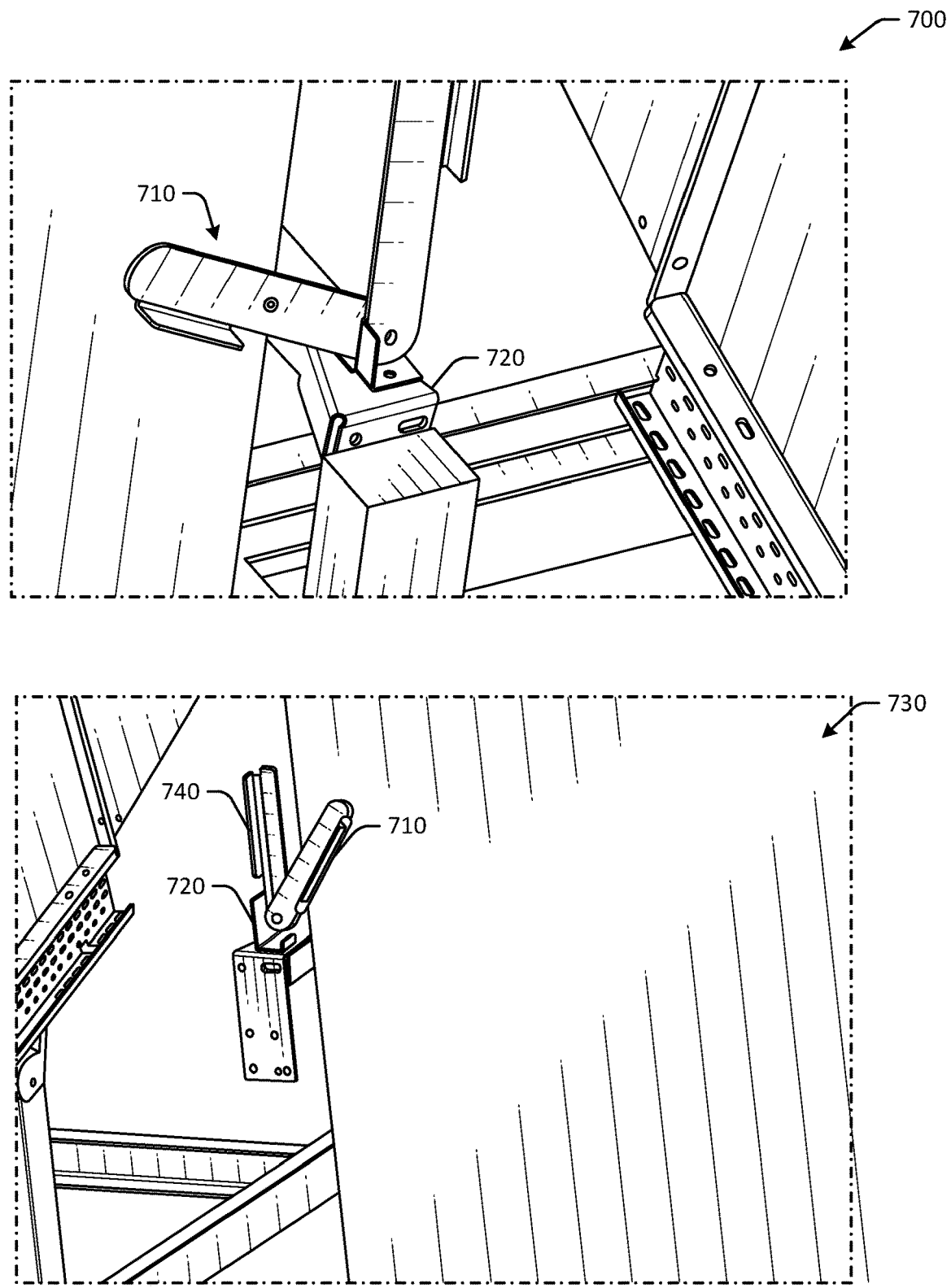
FIGS. 7A-7D are schematic illustrations of an anti-roll mechanism in accordance with one or more embodiments of the disclosure.

In FIG. 7A, some embodiments may include cart guiding rails 720 that guide carts and/or form slots into which carts can be pushed. The cart guiding rails 720 may be part of the anti-roll mechanism 700 or the sortation system. The anti-roll mechanism 700 may include one or more rotatable latches 710 coupled to the cart guiding rails that are configured to lock or otherwise hold a cart in place, and to prevent the cart from rolling out of a slot. For example, in partially rotated view 730, the rotatable latch 710 is partially rotated from a vertical position in which the cart is unlocked, to a horizontal position in which the cart is locked into position against an anti-tip mechanism A support 740 may be used to retain the rotatable latch 710 in the vertical position.

In one embodiment, the anti-roll mechanism 700 may include a first cart guiding rail disposed along a first side of the first rollable cart, and a second cart guiding rail disposed along a second side of the first rollable cart, where the first rollable cart is disposed between the first cart guiding rail and the second cart guiding rail. The anti-roll mechanism 700 may include a first rotatable latch 710 coupled to the first cart guiding rail, the first rotatable latch 710 configured to rotate in a first direction from a vertical position to a horizontal position, and a second rotatable latch coupled to the second cart guiding rail, the second rotatable latch configured to rotate in a second direction from the vertical position to the horizontal position. The first rotatable latch and the second rotatable latch may be configured to secure the first rollable cart in contact with the first anti-tip mechanism when the first rotatable latch and the second rotatable latch are in the horizontal position.

Figure 7B:
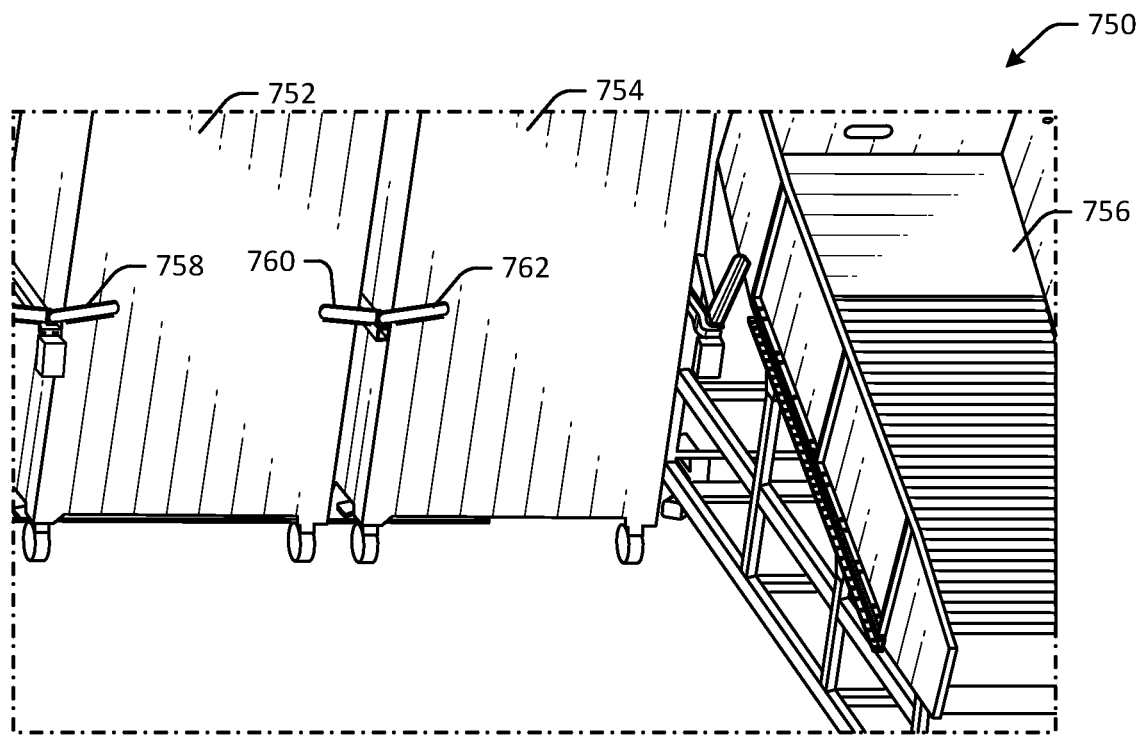
Figure 7C:
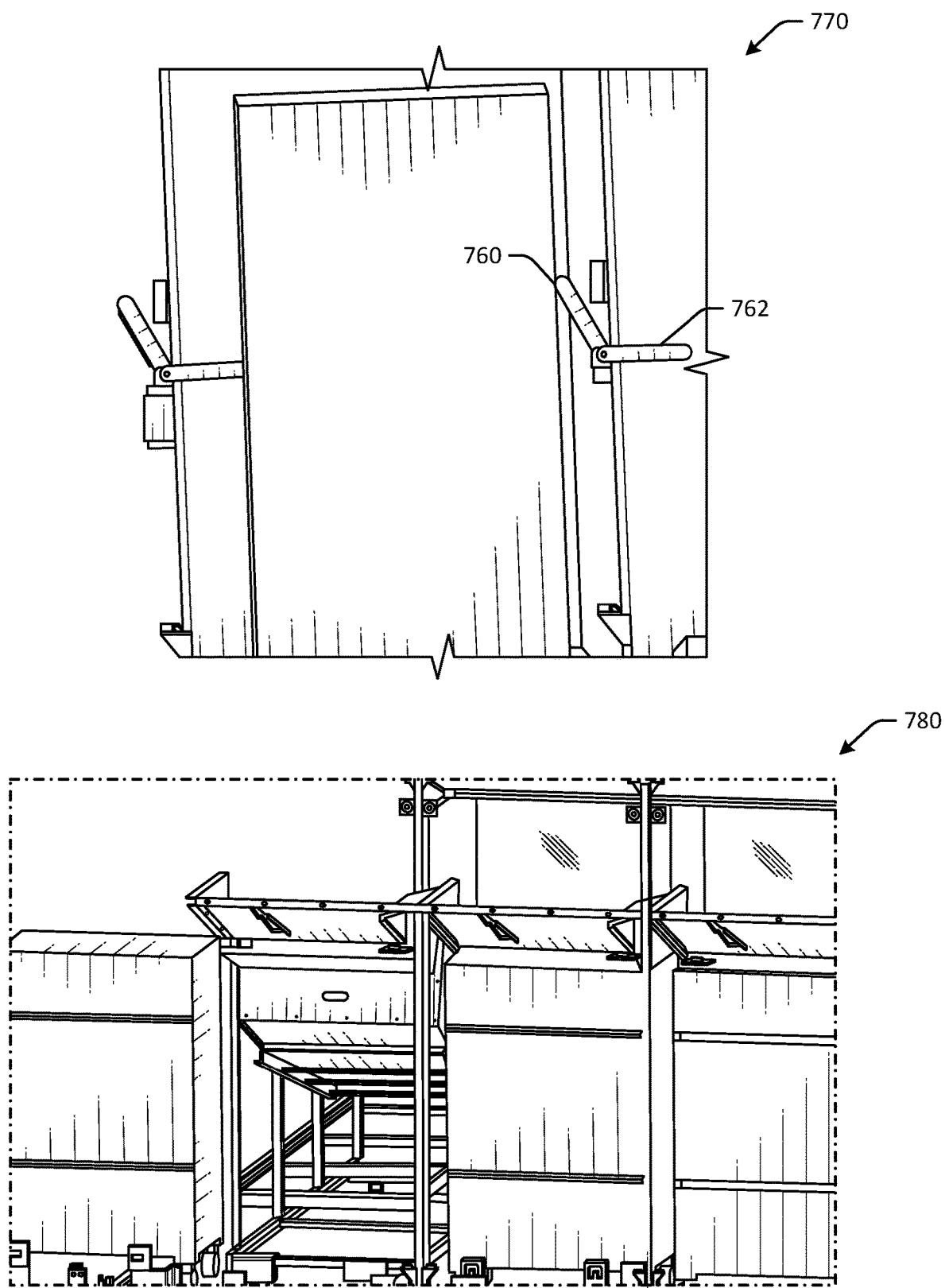
Figure 7D:
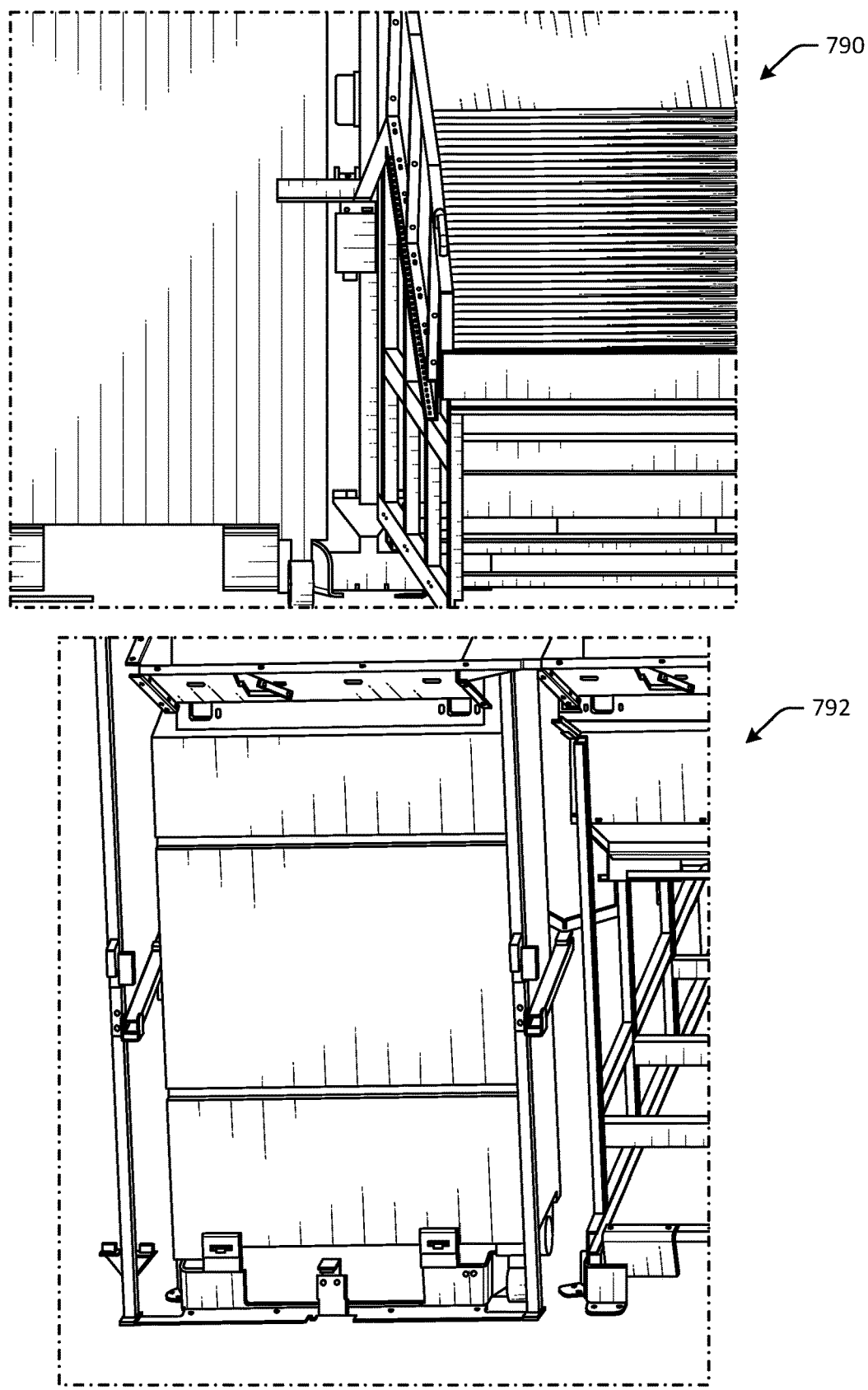

In FIG. 7B, a number of carts and ramps 750 are illustrated in the locked position adjacent to a number of chutes. For example, a first cart 752 may be secured adjacent to a first chute via a first latch 758 and a second latch 760. A second cart 754 may be secured adjacent to a second chute via a third latch 762. Any number of latches may be used to secure carts in position engaged with anti-tip mechanisms. An extended ramp 756 may be disposed adjacent to a third chute and may be used to guide packages to a different downstream process or cart. In FIG. 7C, a close-up view of the second latch 760 and the third latch 762 depicts the second latch 760 is a partially closed position.

One or more operations of the methods, process flows, or use cases of FIGS. 1-7D may have been described above as being performed by a user device, or more specifically, by one or more program module(s), applications, or the like executing on a device. It should be appreciated, however, that any of the operations of the methods, process flows, or use cases of FIGS. 1-7D may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7D may be described in the context of the illustrative devices, it should be appreciated that such operations may be implemented in connection with numerous other device configurations.

The operations described and depicted in the illustrative methods, process flows, and use cases of FIGS. 1-7D may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7D may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
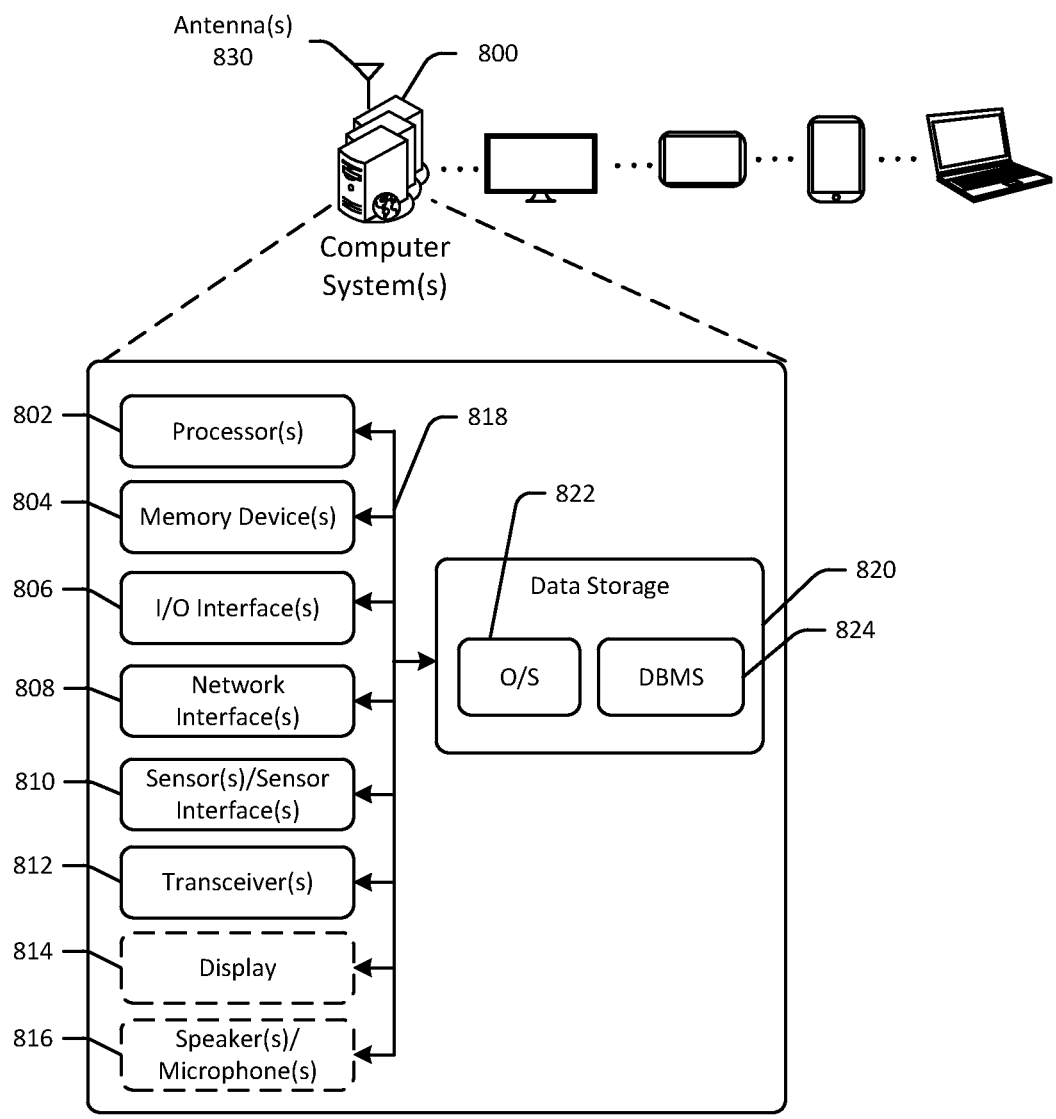
FIG. 8 schematically illustrates an example architecture of a computer system associated with a sortation system in accordance with one or more embodiments of the disclosure.

FIG. 8 is a schematic block diagram of one or more illustrative computer system(s) 800 in accordance with one or more example embodiments of the disclosure. The computer system(s) 800 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 800 may correspond to an illustrative device configuration for a computer system used in conjunction with the system(s) of FIGS. 1-7D.

The computer system(s) 800 may be configured to communicate with one or more servers, user devices, or the like. The computer system(s) 800 may be configured to cause the sortation system(s) to sort items into one or more moveable carts.

The computer system(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The computer system(s) 800 may further include one or more bus(es) 818 that functionally couple various components of the computer system(s) 800. The computer system(s) 800 may further include one or more antenna(s) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the computer system(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the computer system(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the computer system(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the computer system(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the computer system(s) 800 and the hardware resources of the computer system(s) 800. More specifically, the O/S 822 may include a set of computer-executable instructions for managing the hardware resources of the computer system(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 800 is a mobile device, the DBMS 824 may be any suitable lightweight DBMS optimized for performance on a mobile device.

Referring now to other illustrative components of the computer system(s) 800, the input/output (I/O) interface(s) 806 may facilitate the receipt of input information by the computer system(s) 800 from one or more I/O devices as well as the output of information from the computer system(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 800 may further include one or more network interface(s) 808 via which the computer system(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(s) 830 may include any suitable type of antenna depending, for example, on the communications protocols used to transmit or receive signals via the antenna(s) 830. Non-limiting examples of suitable antennas may include directional antennas, non-directional antennas, dipole antennas, folded dipole antennas, patch antennas, multiple-input multiple-output (MIMO) antennas, or the like. The antenna(s) 830 may be communicatively coupled to one or more transceivers 812 or radio components to which or from which signals may be transmitted or received.

As previously described, the antenna(s) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 830 may be configured to transmit or receive radio frequency signals within any suitable frequency range forming part of the unlicensed portion of the radio spectrum.

The antenna(s) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 830—transmitting or receiving radio frequency (RF) signals in the bandwidth and/or channels corresponding to the communications protocols utilized by the computer system(s) 800 to communicate with other devices. The transceiver(s) 812 may include hardware, software, and/or firmware for modulating, transmitting, or receiving—potentially in cooperation with any of antenna(s) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the computer system(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the computer system(s) 800 may include alternate and/or additional hardware, software, or firmware components beyond those described or depicted without departing from the scope of the disclosure. More particularly, it should be appreciated that software, firmware, or hardware components depicted as forming part of the computer system(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A sortation system comprising:
   a conveyor along which a first package and a second package move;
   a plurality of chutes disposed adjacent to the conveyor, the plurality of chutes comprising a first chute and a second chute, wherein packages can be diverted from the conveyor to a chute of the plurality of chutes;
   a first rollable cart disposed at an end of the first chute, the first rollable cart comprising a first bottom platform and mesh sidewalls, wherein packages sliding down the first chute land in the first rollable cart, and wherein the conveyor is elevated with respect to the first rollable cart;

a second rollable cart disposed at an end of the second chute, the second rollable cart comprising a second bottom platform and mesh sidewalls, wherein packages sliding down the second chute land in the second rollable cart; and a first anti-tip mechanism configured to prevent tipping of the first rollable cart away from the first chute, the first anti-tip mechanism comprising:

a frame;

a first C-shaped component coupled to the frame, wherein the first C-shaped component is adjustable from a first vertical height to a second vertical height;

a first sensor coupled to the first C-shaped component; and a second C-shaped component coupled to the frame, wherein the second C-shaped component is adjustable from the first vertical height to the second vertical height;

wherein the first C-shaped component is configured to receive a first portion of the first bottom platform of the first rollable cart, and the second C-shaped component is configured to receive a second portion of the first bottom platform of the first rollable cart, such that the bottom platform of the first rollable cart is prevented from vertical movement.

2. The sortation system of claim 1, further comprising:
a first cart guiding rail disposed along a first side of the first rollable cart;
a second cart guiding rail disposed along a second side of the first rollable cart, wherein the first rollable cart is disposed between the first cart guiding rail and the second cart guiding rail;
a first rotatable latch coupled to the first cart guiding rail, the first rotatable latch configured to rotate in a first direction from a vertical position to a horizontal position; and
a second rotatable latch coupled to the second cart guiding rail, the second rotatable latch configured to rotate in a second direction from the vertical position to the horizontal position;
wherein the first rotatable latch and the second rotatable latch are configured to secure the first rollable cart in contact with the first anti-tip mechanism when the first rotatable latch and the second rotatable latch are in the horizontal position.

3. The sortation system of claim 1, further comprising:
a controller configured to:
determine, based at least in part on feedback from the first sensor, that the first rollable cart is positioned adjacent to the end of the first chute; and
automatically cause packages to be diverted down the first chute.

4. The sortation system of claim 1, wherein the first anti-tip mechanism further comprises:
a set of flared guides; and
a second sensor coupled to the frame of the first anti-tip mechanism, wherein the first sensor or the second sensor is configured to detect presence of the first rollable cart.

5. A sortation system comprising:
a first chute configured to guide packages to a first moveable cart that is disposed at a first end of the first chute;
a first anti-tip mechanism configured to prevent tipping of the first moveable cart, the first anti-tip mechanism comprising:
a frame;
a first C-shaped component coupled to the frame; and
a second C-shaped component coupled to the frame; and
a first sensor coupled to the first C-shaped component, wherein the first sensor is configured to detect presence of the first moveable cart within a predetermined distance of the first sensor;
wherein the first C-shaped component is configured to engage a first portion of the first moveable cart, and the second C-shaped component is configured to engage a second portion of the first moveable cart, such that the first moveable cart is prevented from vertical movement.

6. The sortation system of claim 5, further comprising:
a conveyor disposed adjacent to a second end of the first chute, wherein the packages move along the conveyor, and wherein the conveyor is elevated with respect to the first end of the first chute;
a second chute configured to guide packages to a second moveable cart that is disposed at a first end of the second chute; and
a second anti-tip mechanism configured to prevent tipping of the second moveable cart.

7. The sortation system of claim 5, further comprising:
a second sensor coupled to the frame of the first anti-tip mechanism.

8. The sortation system of claim 7, wherein the second sensor is disposed at a different vertical position than the first sensor.

9. The sortation system of claim 5, wherein the sortation system further comprises:
a first cart guiding rail;
a second cart guiding rail, wherein the first moveable cart is disposed between the first cart guiding rail and the second cart guiding rail;
a first rotatable latch coupled to the first cart guiding rail and configured to rotate from a vertical position to a horizontal position; and
a second rotatable latch coupled to the second cart guiding rail and configured to rotate from the vertical position to the horizontal position;
wherein the first rotatable latch and the second rotatable latch are configured to secure the first moveable cart in contact with the first anti-tip mechanism.

10. The sortation system of claim 5, wherein the first anti-tip mechanism further comprises:
a set of flared guides to facilitate positioning of the first moveable cart adjacent to the first chute.

11. The sortation system of claim 5, further comprising:
a controller configured to:
determine, based at least in part on feedback from the first sensor, that the first moveable cart is positioned adjacent to the end of the first chute; and
automatically cause packages to be diverted down the first chute.

12. The sortation system of claim 5, wherein the first anti-tip mechanism is coupled to a floor and is not coupled to the sortation system.

13. The sortation system of claim 5, further comprising the first moveable cart, wherein the first moveable cart comprises a bottom platform that engages the first anti-tip mechanism when the first moveable cart is positioned adjacent to the first end of the first chute.

14. The sortation system of claim 5, wherein the first moveable cart comprises a bottom platform, and wherein the first C-shaped component is configured to engage a first portion of the bottom platform, and the second C-shaped component is configured to engage a second portion of the bottom platform.

15. The sortation system of claim 5, wherein the first C-shaped component is configured to adjust from a first vertical position to a second vertical position.

16. A sortation system comprising:
a first moveable cart comprising a bottom platform, wherein the first moveable cart is configured to be manually rolled and lifted by a robotic vehicle via the bottom platform;
a first chute configured to guide packages to the first moveable cart; and
a first anti-tip mechanism configured to prevent tipping of the first moveable cart, the first anti-tip mechanism comprising:
 a frame;
 a first C-shaped component coupled to the frame; and
 a second C-shaped component coupled to the frame;
wherein the first C-shaped component is configured to engage a first portion of the bottom platform, and the second C-shaped component is configured to engage a second portion of the bottom platform, such that the first moveable cart is prevented from vertical movement.

17. The sortation system of claim 16, further comprising:
a conveyor disposed adjacent to the first chute, wherein the packages move along the conveyor;
a second chute configured to guide packages to a second moveable cart; and
a second anti-tip mechanism configured to prevent tipping of the second moveable cart.

18. The sortation system of claim 16, further comprising:
a first sensor coupled to the first C-shaped component, wherein the first sensor is configured to detect presence of the first moveable cart within a predetermined distance of the first sensor.

19. The sortation system of claim 16, further comprising:
a first cart guiding rail;
a second cart guiding rail, wherein the first moveable cart is disposed between the first cart guiding rail and the second cart guiding rail;
a first rotatable latch coupled to the first cart guiding rail and configured to rotate from a vertical position to a horizontal position; and
a second rotatable latch coupled to the second cart guiding rail and configured to rotate from the vertical position to the horizontal position;
wherein the first rotatable latch and the second rotatable latch are configured to secure the first moveable cart in contact with the first anti-tip mechanism.

* * * * *